Patented Mar. 3, 1953

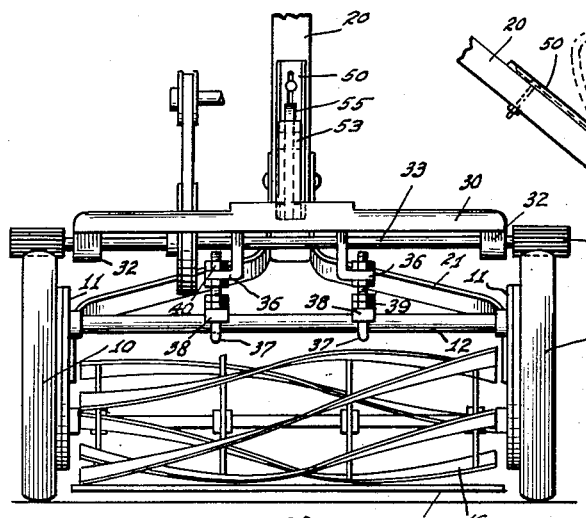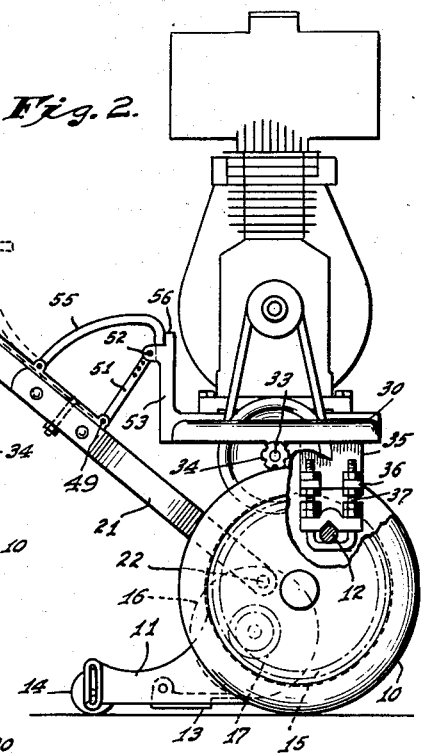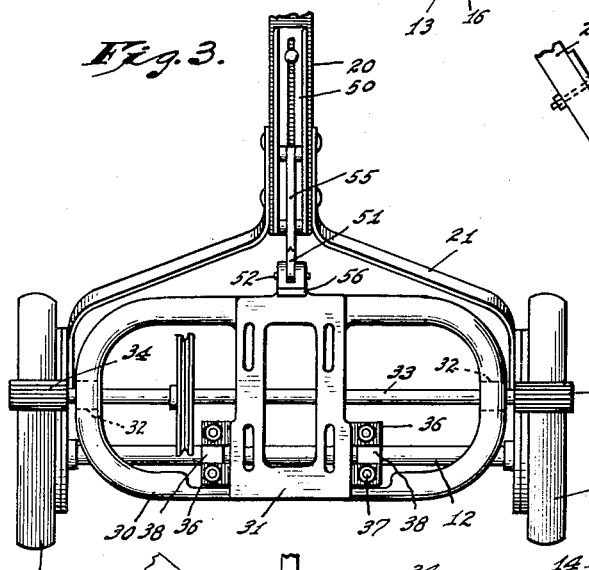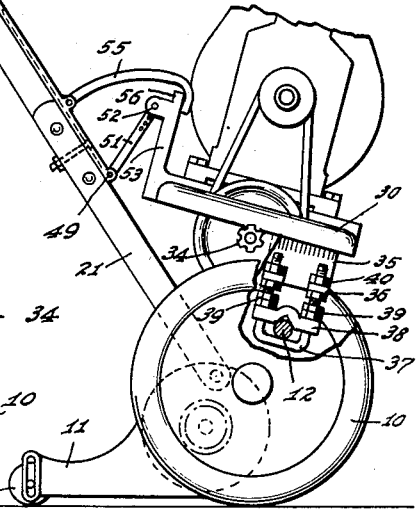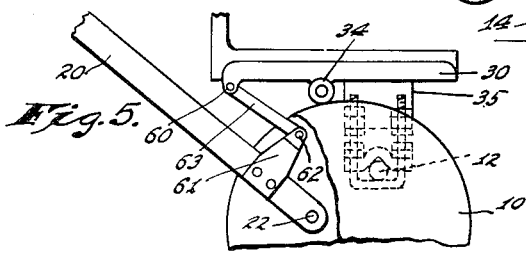

2,630,185

UNITED STATES PATENT OFFICE 2,630,185

POWER UNIT FOR LAWN MOWERS

Edwin R. Adams, Indianapolis, Ind., assignor to Alfred E. Kuerst, Indianapolis, Ind.

Application April 4, 1949, Serial No. 85,340

2 Claims. (Cl. 180—19)

This invention relates to a power unit for a lawn-mower. It is the object of my invention to provide a power unit which will have substantial universal applicability to lawn-mowers built for manual operation, which will be simple and inexpensive in construction, which is adapted to be sold as a unit for attachment to any available mower, and which can be attached to the lawn-mower simply and conveniently, and substantially without modification of the mower. It is a further object of my invention to provide a power unit for a lawn-mower whose operation will be readily controlled by the elevation and depression of the lawn-mower handle.

Lawn-mowers of the type to which my invention is applicable have a pair of spaced ground-engaging wheels geared to drive a cutting reel and mounted on side frame members which are interconnected by a shearing blade support disposed below the cutting reel and by a shrub bar disposed above and forward of the ground-wheel axis. A roller is positioned behind the ground engaging wheels, and the handle is pivoted to the side frame members behind the ground wheel axis.

In carrying out my invention, I pivot a motor supporting frame on the shrub bar, at a point on such frame well ahead of the center of gravity of the power unit, I provide a pair of driving pinion wheels on a transverse shaft behind the pivot axis, in position to be pressed against the ground engaging wheels of the mower by the weight of the motor and frame, and I interconnect the mower handle with the motor supporting frame by a toggle link, so that vertical movement of the handle causes the mower frame to pivot between a drive-engaged position in which its pinion wheels are in driving engagement with the ground wheels of the mower, and a drive-disengaged position in which such pinion wheels are out of engagement with the ground wheels. When the toggle linkage is such that depression of the handle carries the driving pinions into driving engagement with the ground wheels, I desirably associate with the toggle linkage a hook and latch mechanism which may be engaged selectively to lock the power unit either in drive-engaged position or in drive-disengaged position.

The accompanying drawing illustrates my invention. In such drawing, Fig. 1 is a front elevation of a hand lawn-mower equipped with a power unit frame in accordance with my invention, but with the motor omitted; Fig. 2 is a side elevation of the mower and power unit shown in Fig. 1, with a motor mounted thereon, and with the power unit locked in drive-engaged position; Fig. 3 is a plan view of the device shown in Fig. 1; Fig. 4 is a side elevation similar to Fig. 2, but showing the power unit locked in elevated position; and Fig. 5 is a fragmental side elevation corresponding to Fig. 2 and showing a modified form of toggle linkage.

The lawn-mower shown in Figs. 1 to 4 comprises a pair of spaced ground wheels 10 journaled on side frame members 11 which are interconnected by a shrub bar 12 and by the supporting structure for the shearing blade 13. The side frame members 11 extend rearwardly from the wheels 10 and at their rear ends carry a ground roller 14. In accordance with usual construction, internal ring gears 15 on the ground wheels 10 drive the cutter reel 16 through pinion gears 17. A handle 20 located centrally between the wheels is supported by forwardly diverging bars 21 pivoted to pins 22 on the side frames 11 just behind the axis of the wheels 10, and such handle has limited vertical movement about its pivots 22.

The frame 30 of my power unit is of generally oval shape and provides a central motor platform 31. Depending bosses 32 at its ends form bearings for a drive shaft 33, on the ends of which a pair of driving pinions 34 are mounted for axial adjustment to engage the ground wheels 10. Adjacent the front of the frame 30 there are a pair of depending supports 35 whose lower ends are turned outward to form mounting pads 36. Each mounting pad is provided with a pair of spaced holes to receive the legs of a U-bolt 37, and each U-bolt carries a mounting yoke 38. As may be seen in Figs. 2 and 4, the yokes 38 have downwardly open V-shaped locating grooves to make supporting engagement with the shrub bar 12 of the mower, and are held thereagainst by the bottom of the U-bolts 37. The yokes are locked in such engagement and for pivotal movement on the bar 12 by a pair of nuts 39 on each leg of the U-bolts 37. Above such nuts 39, the mounting pads 36 are supported in adjusted position on the upwardly projecting legs of the U-bolt by pairs of nuts 40 tightened against opposite faces of the pads 36. By this simple mounting arrangement, the frame 30 may be suitably positioned on the shrub bar 12 of substantially any mower of this general type.

An elongated plate 50 having a pair of pivot lugs 49 at its lower end is secured to the handle 20, and is desirably formed with a longitudinal slot throughout substantially its whole length so that it is suited for mounting on handles of different constructions, and can be adjusted longitudinally of the handle to bring its pivot lugs to a suitable position. A toggle link 51 fitting between such lugs 49 and pivoted thereto, is connected to a pair of lugs 52 on a post 53 upstanding from the rear of the frame 30. To adapt the unit to different mowers, I desirably provide the link 51 with a number of spaced pivot holes, as at its top end as shown in Fig. 2, so that in mounting the unit on a particular mower the hole may be selected which suits the conditions of such mower.

With the handle linked to the frame 30 as shown in Figs. 2 and 4, elevation of the handle 20 elevates the rear of the frame 30 and pivots it about the shrub bar 12 to the drive-disengaged position shown in Fig. 4, where the pinions 34 are out of engagement with the ground wheels 10; and depression of the handle 20 lowers the frame 30 to drive-engaged position shown in Fig. 2, where the pinions 34 are in driving engagement with the ground wheels 10. To lock the frame selectively in these two positions, I pivot a hook 55 on the plate 50 at a point spaced outward along the handle from the link 51, and provide the upper end of the post 53 with a lug 56 for engagement by the hook 55. As shown in Fig. 2, where the unit is in drive-engaged position, the hook is engaged behind the lug 56, and the handle 20 is held in depressed position and the frame 30 is held in position with the driving pinions 34 in driving engagement with the ground wheels 10. As shown in Fig. 4, where the unit is in drive-disengaged position, the hook 55 is hooked over the lug 56 and the handle 20 is held in elevated position, and the frame 30 is held up, with the driving pinions 34 out of engagement with the ground wheels 10. For ordinary use, as on level ground, the hook 55 may be swung rearward to the inoperative position shown in dotted lines in Fig. 2.

In the construction shown in Figs. 1 to 4, toggle linkage is formed by the link 51 and by the lower end of the handle structure, with its intermediate linkage point—where the lower end of link 51 is pivoted in the lugs 49—behind the plane joining the axis of the handle pivots 22 and the upper pivot 52 of the link 51; and in such case driving engagement of the pinions 34 is effected by depressing the handle 20, and disengagement is effected by elevating the handle 20. The converse control of engagement and disengagement is obtained by the modified linkage shown in Fig. 5. In this case the toggle linkage acts between the handle pivot 22 and a linkage pivot 60 positioned adjacent the rear edge of the frame 30. The handle structure is provided with a suitable fitting or fittings 61 which project upwardly and forwardly across the plane defined by the pivots 22 and 60, to provide an intermediate linkage axis 62 ahead of that plane; and this intermediate linkage point is connected to the pivot 60 by a link 63. In this case, depression of the handle 20 increases the effective length of the toggle linkage between the points 22, 62, and 60, and lifts the rear edge of the frame 30. to pivot it about the shrub bar 12 to drive-disengaged position where the driving pinions 34 are out of engagement with the ground wheels 10. Elevation of the handle 20, on the other hand, shortens the effective length of the toggle linkage and lowers the pinions 34 into engagement with the ground wheels 10.

In most cases with the linkage of Fig. 5, the weight of the handle 20 will be sufficient to move the power unit to drive-disengaged position, or to hold it in such position, in which case the interlocking hook mechanism corresponding to the hook 55 and lug 56 of the other modification may be omitted. But if desired, this modification of Fig. 5 may also be equipped with a hook 55 and lug 56 corresponding to that shown in Figs. 1 to 4. In such case, the alternative engaged positions of the hook 55 will have the opposite effect from that shown in Figs. 2 and 4, for when the hook is engaged as in Fig. 4 to hold the handle in elevated position, the unit will be in the drive-engaged position shown in Fig. 5, because of the converse action of the toggle linkage.

With the power unit held in drive-disengaged position as by engagement of the hook 55 as shown in Fig. 4, the power motor may be started in the usual manner. The hook 55 (if it is used) is then disengaged from its drive-disengaged position and the mower is ready for operation. When the handle is moved to cause the toggle linkage to bring the drive unit to drive-engaged position, the pinions 34 come into driving engagement with the ground wheels 10 and propel the mower across the lawn. It is guided by the handle in the usual manner, and its movement is controlled by suitably depressing or elevating the handle. In normal use on level ground, I find it convenient to position the interlocking hook 55 in inoperative position; and when the mower is operated up an inclined surface, I find it convenient to engage the hook 55 in drive-engaged position, so that any assisting force applied to the handle will have no tendency to disengage the drive.

I claim as my invention:

1. In combination, a power unit for a lawn-mower having a pair of spaced coaxial ground wheels, a transverse shrub bar ahead of the ground-wheel axis, and a handle pivoted on a rearwardly spaced axis parallel therewith, said power unit comprising a frame, means adjacent the front of the frame to pivotally support it on the shrub-bar, a drive shaft journaled in said frame behind said pivotal support and parallel with the axis thereof, ground-wheel engaging drive pinions on said shaft, a motor support on the frame, a link pivot adjacent the rear of the frame, and a link for connection between said link pivot and a point on said handle behind the plane joining the link pivot and the pivotal axis of the handle, whereby pivotal lowering of said handle when so connected causes movement of said pinion shaft to drive-engaged position, and means acting between said handle and frame in association with said link and including a releasable hook and a stop therefore, engageable selectively in positions to hold said linkage alternatively in drive-engaged position and in drive-disengaged position.

2. In a power unit for a lawn-mower having spaced wheels and a shrub bar eccentric with respect thereto, a motor support, means to attach said motor support on said shrub bar, a drive shaft carried by said motor support on an axis to be spaced from said shrub bar, said attachment means comprising a mounting pad having a pair of spaced holes, a U-bolt received therein and adapted to embrace the shrub bar, a yoke on the U-bolt and nuts thereon to clamp said yoke against said shrub bar in supporting engagement with respect to said U-bolt, and additional nuts on said U-bolt to support said mounting pad in adjusted position on said U-bolt.

EDWIN R. ADAMS.

REFERENCES CITED

The following references are of record in the file of this patent:

UNITED STATES PATENTS

| Number | Name | Date |
|---|---|---|
| 1,124,162 | Monahan | Jan. 5, 1915 |
| 1,837,862 | Simmen | Nov. 15, 1932 |
| 2,166,450 | Smalley | July 18, 1939 |
| 2,220,705 | Burckes | Nov. 9, 1940 |
| 2,468,839 | Rodesci | May 3, 1949 |